United States Patent
Kinder et al.

(10) Patent No.: US 10,116,625 B2
(45) Date of Patent: Oct. 30, 2018

(54) SYSTEMS AND METHODS FOR SECURE CONTAINERIZATION

(71) Applicant: SECUREWORKS HOLDING CORPORATION, Atlanta, GA (US)

(72) Inventors: Ross R. Kinder, Ann Arbor, MI (US);
Jon R. Ramsey, Atlanta, GA (US);
Timothy M. Vidas, Omaha, NE (US);
Robert Danford, Boulder, CO (US)

(73) Assignee: SECUREWORKS, CORP., Wilmington, DE (US)

( * ) Notice: Subject to any disclaimer, the term of this patent is extended or adjusted under 35 U.S.C. 154(b) by 182 days.

(21) Appl. No.: 14/991,628

(22) Filed: Jan. 8, 2016

(65) Prior Publication Data

US 2017/0201490 A1  Jul. 13, 2017

(51) Int. Cl.
*H04L 29/06* (2006.01)

(52) U.S. Cl.
CPC ...... *H04L 63/0272* (2013.01); *H04L 63/0227* (2013.01); *H04L 63/0281* (2013.01); *H04L 63/1433* (2013.01); *H04L 63/20* (2013.01)

(58) Field of Classification Search
CPC . H04L 63/0272; H04L 63/1433; H04L 63/20; H04L 63/0227; H04L 63/0281
See application file for complete search history.

(56) References Cited

U.S. PATENT DOCUMENTS

| | | | | |
|---|---|---|---|---|
| 7,272,646 B2* | 9/2007 | Cooper | .............. | H04L 41/069 709/223 |
| 7,299,292 B2 | 11/2007 | Morten et al. | | |
| 7,502,836 B1* | 3/2009 | Menditto | .......... | H04L 29/12113 709/217 |
| 7,559,092 B2* | 7/2009 | Anson | .................... | G06F 21/83 726/34 |
| 7,587,499 B1* | 9/2009 | Haghpassand | .......... | G06F 21/50 370/229 |
| 7,792,994 B1* | 9/2010 | Hernacki | ............... | H04L 12/66 709/229 |
| 7,917,647 B2* | 3/2011 | Cooper | ................. | H04L 41/046 370/229 |
| 7,962,516 B2* | 6/2011 | Bahrs | ................. | G06F 21/6218 707/783 |
| 8,286,228 B2 | 10/2012 | Venters, III et al. | | |
| 8,589,557 B1* | 11/2013 | Labat | .................... | G06F 9/5061 709/226 |
| 8,621,556 B1* | 12/2013 | Bharali | .............. | H04L 61/1511 726/1 |
| 8,713,631 B1* | 4/2014 | Pavlyushchik | ....... | G06F 21/566 726/1 |

(Continued)

*Primary Examiner* — David Garcia Cervetti
(74) *Attorney, Agent, or Firm* — Larson Newman, LLP (57) ABSTRACT

A method for provisioning a secure container for running an application includes routing traffic between the application and a secure container service over a virtual private network, and restricting the flow of traffic to or from the application other than traffic to or from the secure container service. The method further includes providing limited name resolution for the secure container with a customized domain name system server, establishing network proxy services to filter and route approved inbound traffic to the application, and establishing outbound network proxy services to filter and route approved outbound traffic from the application.

15 Claims, 5 Drawing Sheets

(56) References Cited

U.S. PATENT DOCUMENTS

| | | | |
|---|---|---|---|
| 9,015,318 B1* | 4/2015 | Batz | H04L 61/1511 709/217 |
| 9,223,966 B1* | 12/2015 | Satish | G06F 21/53 |
| 9,317,410 B2* | 4/2016 | Eilam | G06F 11/3688 |
| 9,467,474 B2* | 10/2016 | Barton | G06F 9/4445 |
| 9,654,508 B2* | 5/2017 | Barton | H04L 63/20 |
| 9,672,140 B1* | 6/2017 | Eberlein | G06F 11/3664 |
| 9,686,158 B1* | 6/2017 | Krueger | H04L 43/04 |
| 9,705,922 B2* | 7/2017 | Foxhoven | H04L 63/20 |
| 9,715,537 B2* | 7/2017 | Lachaume | G06F 9/4488 |
| 9,720,709 B1* | 8/2017 | Stickle | G06F 9/5077 |
| 9,805,206 B2* | 10/2017 | Gounares | H04L 63/08 |
| 9,807,077 B2* | 10/2017 | Gounares | H04L 63/08 |
| 9,906,559 B2* | 2/2018 | Cudak | H04L 63/20 |
| 2002/0010798 A1* | 1/2002 | Ben-Shaul | G06F 17/3089 709/247 |
| 2002/0078233 A1* | 6/2002 | Biliris | H04L 29/06 709/238 |
| 2002/0173984 A1* | 11/2002 | Robertson | G06Q 10/10 709/220 |
| 2003/0004744 A1* | 1/2003 | Greene | G06Q 10/063112 705/1.1 |
| 2005/0278790 A1* | 12/2005 | Birk | G06F 21/54 726/26 |
| 2006/0288076 A1* | 12/2006 | Cowings | H04L 51/12 709/206 |
| 2008/0127349 A1* | 5/2008 | Ormazabal | H04L 63/1458 726/25 |
| 2009/0003600 A1* | 1/2009 | Chen | H04N 7/1675 380/217 |
| 2010/0146267 A1* | 6/2010 | Konetski | G06F 21/53 713/164 |
| 2010/0180080 A1 | 7/2010 | Lin et al. | |
| 2010/0217853 A1* | 8/2010 | Alexander | H04L 63/20 709/223 |
| 2010/0262752 A1* | 10/2010 | Davis | G06F 3/0613 711/103 |
| 2010/0299362 A1* | 11/2010 | Osmond | G06F 21/6218 707/781 |
| 2010/0306269 A1* | 12/2010 | Osmond | G06F 17/30067 707/792 |
| 2011/0010701 A1* | 1/2011 | Cooper | G06F 21/12 717/175 |
| 2011/0307955 A1* | 12/2011 | Kaplan | H04L 63/0227 726/23 |
| 2012/0060171 A1* | 3/2012 | Bobroff | G06F 9/505 718/105 |
| 2012/0174217 A1* | 7/2012 | Ormazabal | H04L 63/1458 726/22 |
| 2013/0058227 A1* | 3/2013 | Lemieux | G06F 9/5077 370/252 |
| 2013/0238715 A1* | 9/2013 | Sanyal | H01L 51/00 709/206 |
| 2014/0006577 A1* | 1/2014 | Joe | H04L 61/1511 709/223 |
| 2014/0026133 A1* | 1/2014 | Parker | G06F 9/5083 718/1 |
| 2014/0075048 A1* | 3/2014 | Yuksel | H04L 45/02 709/242 |
| 2014/0112345 A1* | 4/2014 | Huang | H04L 61/103 370/392 |
| 2014/0242970 A1* | 8/2014 | Yu | H04W 8/02 455/419 |
| 2014/0250501 A1 | 9/2014 | Berard et al. | |
| 2014/0282433 A1* | 9/2014 | Eilam | G06F 11/3688 717/131 |
| 2015/0109995 A1* | 4/2015 | Mathai | H04L 61/301 370/328 |
| 2015/0128152 A1* | 5/2015 | Lachaume | G06F 9/465 719/316 |
| 2015/0134832 A1* | 5/2015 | Gould | H04L 61/1511 709/226 |
| 2015/0181445 A1* | 6/2015 | Godin | H04W 76/32 370/254 |
| 2015/0244811 A1* | 8/2015 | Zhu | G06F 9/00 709/228 |
| 2015/0312100 A1* | 10/2015 | Chan | H04L 63/10 709/222 |
| 2015/0381557 A1* | 12/2015 | Fan | H04L 61/10 709/245 |
| 2016/0036857 A1* | 2/2016 | Foxhoven | H04L 63/20 726/1 |
| 2016/0095032 A1* | 3/2016 | Varney | H04W 24/02 370/329 |
| 2016/0212012 A1* | 7/2016 | Young | H04L 41/14 |
| 2016/0219019 A1* | 7/2016 | Mathur | H04L 63/0272 |
| 2016/0286001 A1* | 9/2016 | Chan | H04L 12/6418 |
| 2016/0301676 A1* | 10/2016 | Gounares | H04L 63/08 |
| 2016/0371495 A1* | 12/2016 | Bhat | G06F 21/53 |
| 2016/0378518 A1* | 12/2016 | Antony | G06F 9/45533 718/1 |
| 2016/0381058 A1* | 12/2016 | Antony | H04L 63/1425 726/23 |
| 2017/0052807 A1* | 2/2017 | Kristiansson | G06F 9/54 |
| 2017/0093922 A1* | 3/2017 | Duan | H04L 63/20 |
| 2017/0093923 A1* | 3/2017 | Duan | H04L 63/1408 |
| 2017/0098072 A1* | 4/2017 | Stopel | G06F 21/554 |
| 2017/0104789 A1* | 4/2017 | Cudak | H04L 63/20 |
| 2017/0109536 A1* | 4/2017 | Stopel | G06F 21/577 |
| 2017/0116412 A1* | 4/2017 | Stopel | G06F 21/577 |
| 2017/0116415 A1* | 4/2017 | Stopel | G06F 21/554 |
| 2017/0118174 A1* | 4/2017 | Mathur | H04L 63/0272 |
| 2017/0126469 A1* | 5/2017 | Liang | H04L 41/04 |
| 2017/0140158 A1* | 5/2017 | Gounares | H04L 63/08 |
| 2017/0149843 A1* | 5/2017 | Amulothu | G06F 9/45558 |
| 2017/0170990 A1* | 6/2017 | Gaddehosur | H04L 12/4675 |
| 2017/0177860 A1* | 6/2017 | Suarez | G06F 21/53 |
| 2017/0177877 A1* | 6/2017 | Suarez | G06F 21/577 |
| 2017/0180346 A1* | 6/2017 | Suarez | G06F 9/45558 |
| 2017/0185507 A1* | 6/2017 | Eberlein | G06F 11/3664 |
| 2017/0187540 A1* | 6/2017 | Stopel | H04L 9/3268 |
| 2017/0199770 A1* | 7/2017 | Peteva | G06F 9/5088 |
| 2017/0310709 A1* | 10/2017 | Foxhoven | H04L 63/20 |

\* cited by examiner

SYSTEMS AND METHODS FOR SECURE CONTAINERIZATION

FIELD OF THE DISCLOSURE

The present disclosure generally relates to information handling systems, and more particularly relates to secure containers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
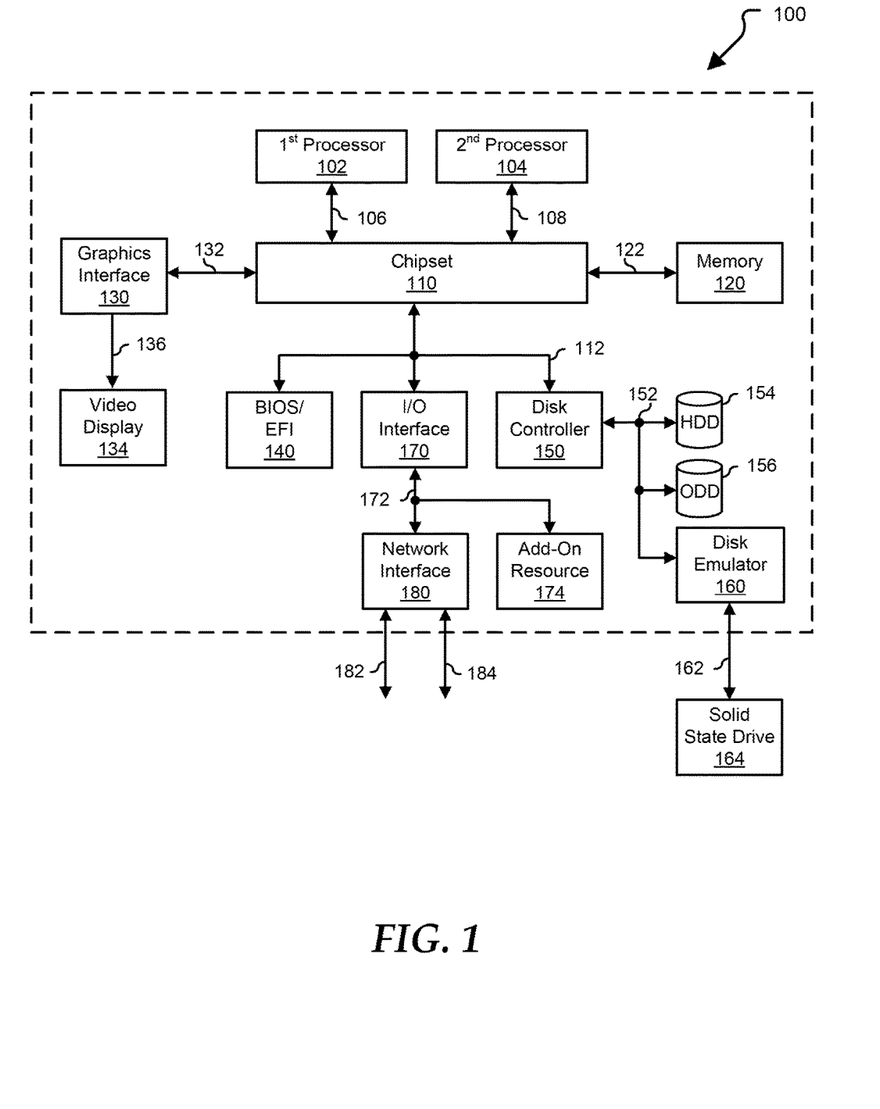
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
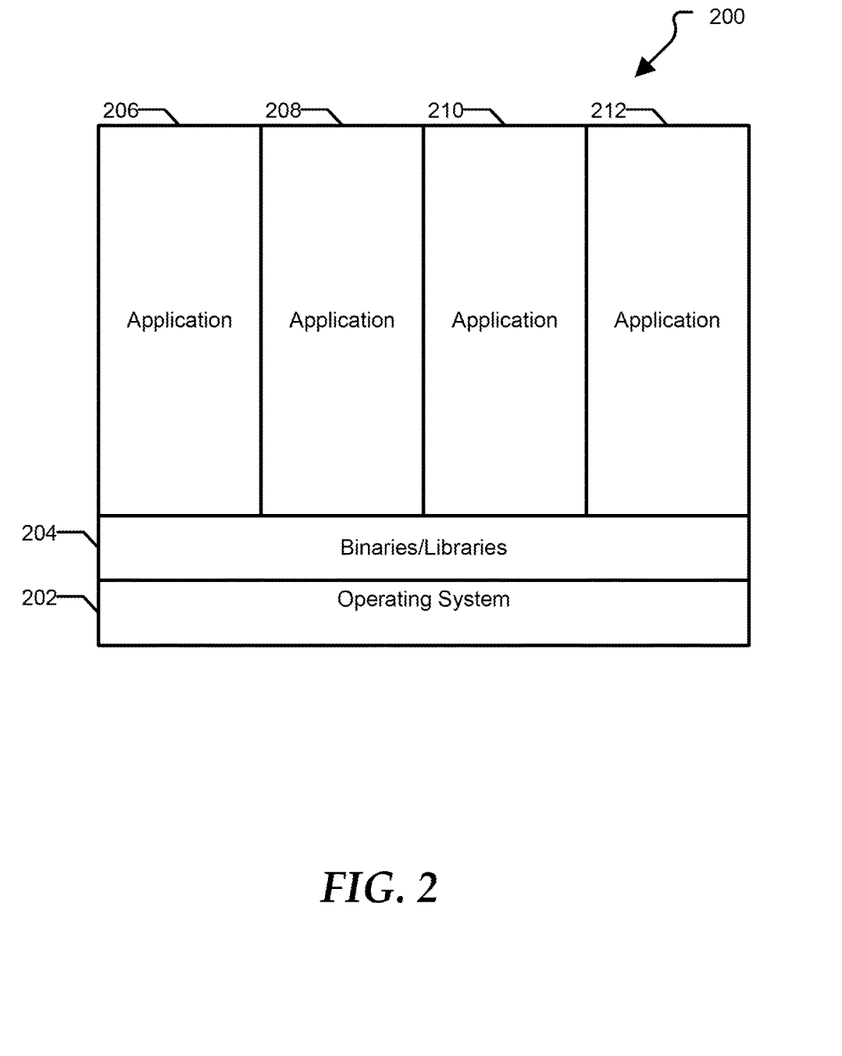
FIG. 2 is a block diagram illustrating a use of virtual containers, in accordance with various embodiments.

FIG. 2 is a block diagram illustrating a system 200 utilizing virtual containers. System 200 consists of a base operating system 202, shared binaries and libraries 204, and a plurality of virtual containers 206, 208, 210, and 212, each housing a separate application. In contrast to a virtual machine, the virtual containers 206, 208, 210, and 212 are much more efficient. Rather than containing a duplicate of the operating system and a complete set of libraries, a virtual container can contain only resources unique to an instance of an application. Generally, this results in a much smaller virtual container, which can be provisioned and moved much more quickly than a complete virtual machine. Additionally, since the virtual container is relying on the underlying operating system, there is no need to wait for the operating system to initialize and startup when provisioning a new virtual container.

In various embodiments, the virtual containers can be run within a virtual machine that sits atop the base OS. In this way, multiple customers of a cloud computing provider can utilize the same underlying hardware and have the scalability and responsiveness to demand provided by a virtual containers. Each customer may have their own virtual machine and can provision a plurality of virtual containers as needed.

Today, many network security services are built into the operating system. In a virtual container environment, by relying on the operating system security services, the virtual containers are vulnerable to compromise from neighboring virtual containers or if the security services of the operating system are bypassed. It would be advantageous to provide similar network security services to each of the individual containers to create a secure container. A secure container would provide a layer of protection from compromised neighboring containers, as well as breaches of the operating system network services.

Figure 3:
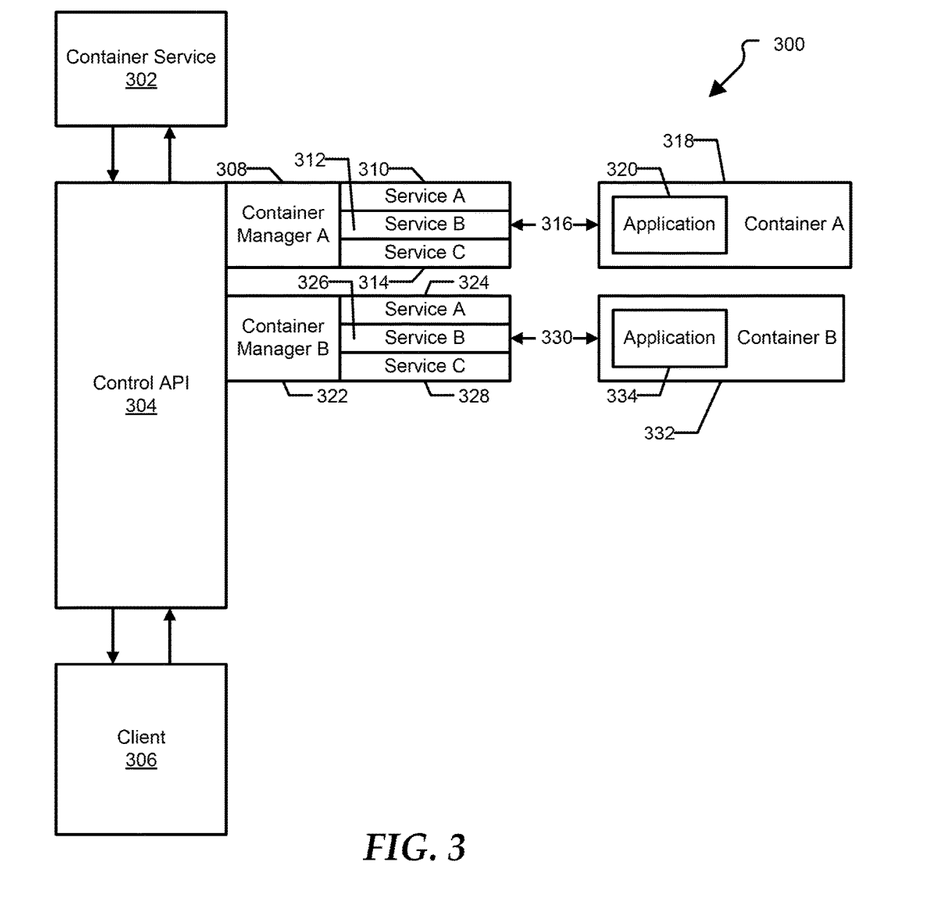
FIG. 3 is block diagram illustrating a secure container architecture, in accordance with various embodiments.

FIG. 3 is a block diagram of a secure container architecture 300. The secure container architecture 300 consists of a container service 302, such as Docker, a secure container control API 304, and a client component 306. The client component 306 issues commands to the container service 302, which can be intercepted by the secure container control API 304. The secure container control API 304 can rewrite the commands and forward them to the container server 302.

The secure container control API 304 can create a container manager 308 and initialize security services 310, 312, and 314. Security services 310, 312, and 314 can include inbound and outbound proxies for network services, such as TCP, HTTP, HTTPS, and the like, as well as a DNS proxy server, network filters, and other services to secure communication. Additionally, a private virtual network 316 can be established between the container 318 and security services 310, 312, and 314. Concurrent with or subsequent to the provisioning of the container security services, the container service 302 can provision application 320 within container 318.

Additional container managers 322, and the associated security services 324, 326, and 328 and private virtual networks 330 can be provisioned for additional containers 332 and associated applications 324 as needed.

In various embodiments, the container security services are abstracted from the application's environment within the container. As such, existing applications prepared for containerization can be migrated to a secure container environment with little to no change.

Figure 4:
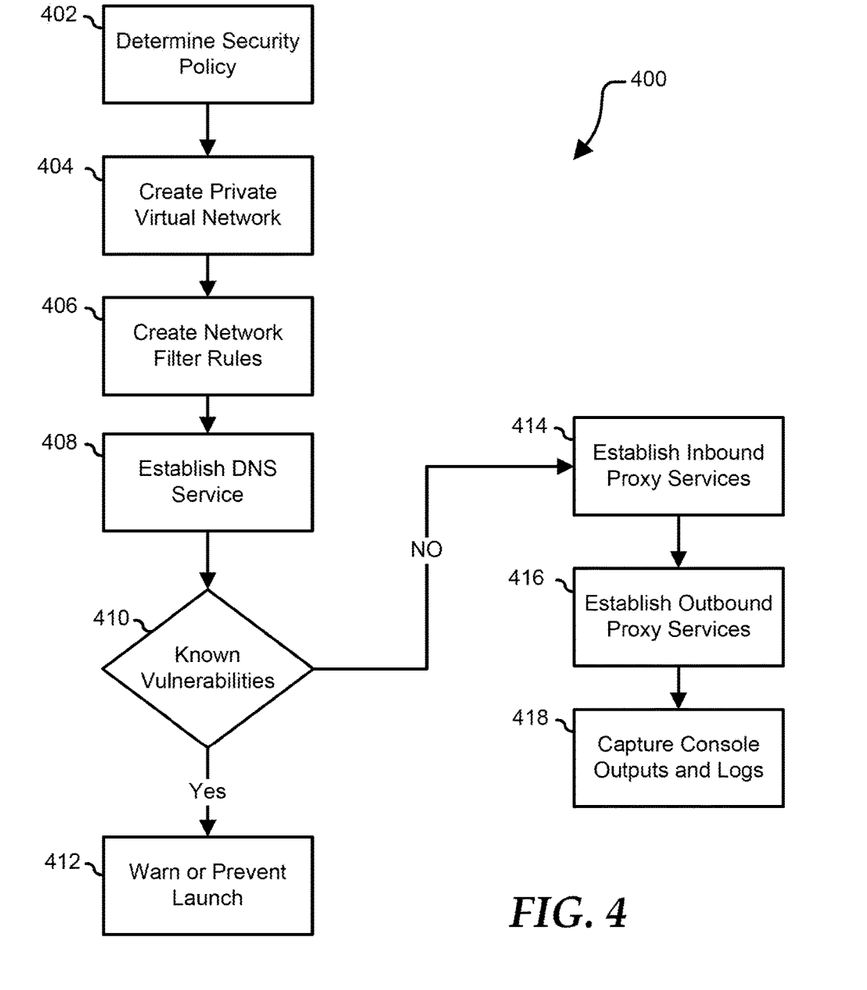
FIG. 4 is a flow diagram illustrating a method of provisioning a secure container, in accordance with various embodiments.

FIG. 4 shows a method 400 of provisioning a secure container, such as container 318 shown in FIG. 3. At 402, a security policy can be determined for the application. The security policy can be determined from an inspection of the container image or startup options for the container. These may include servers which the application can and needs to communicate with, as well as actions to be taken if the container is compromised or a vulnerability is discovered.

At 404, a private virtual network can be established between the application and the secure container service. The use of the private virtual network can substantially prevent intercepting of the traffic between the application and secure container service by a compromised neighboring container. At 406, a set of network filter rules can be established to restrict the flow of traffic to or from the application. The network filter rules can be based on the security policy. In this way, the secure container service can provide a firewall between the application and the environment outside of the container, be that neighboring containers, other servers within a server room, or the internet.

At 408, a Domain Name Server (DNS) service can be established. The DNS service can be customized to only provide name resolution for server names as allowed by a security policy. At 410, the container and application can be tested for known vulnerabilities. In various embodiments, this can include a check of the configuration settings to identify settings or combinations of settings that create known vulnerabilities, a version check of libraries and applications within the container to ensure security patches have been applied appropriately, a port scan of the container and/or network filters to identify weaknesses, or the like. The test for known vulnerabilities can also include a check of the configuration files for the application to ensure the configurations have not been changed in an unauthorized fashion.

At 412, if the test for vulnerabilities identifies vulnerabilities, a warning can be sent to an administrator or the container can be prevented from launching. In various embodiments, known vulnerabilities can be categorized into those that require a warning and those that trigger the system to prevent the container from launching.

At 414, when no know vulnerabilities are identified, inbound proxy services can be established. For example, proxy services can be established for TCP, HTTP, HTTPS and other network protocols, depending on the configuration of the application and the container. The inbound proxy services can filter and route approved inbound traffic to the application within the container.

At 416, outbound proxy services can be established. For example, outbound proxy services can be established for HTTP, HTTPS and other network protocols, depending on the configuration of the application and the container. The outbound proxy services can filter and route approved outbound traffic from the application within the container.

At 418, console outputs, such as standard output and standard error can be captured and forwarded, such as to a logging service. Additionally, any log streams from the application can be captured and forwarded to a logging service. In various embodiments, logging can be sent to a remote system or device to prevent a hacker that compromises the secure container from erasing their tracks and ensure that compromises are readily identifiable.

Figure 5:
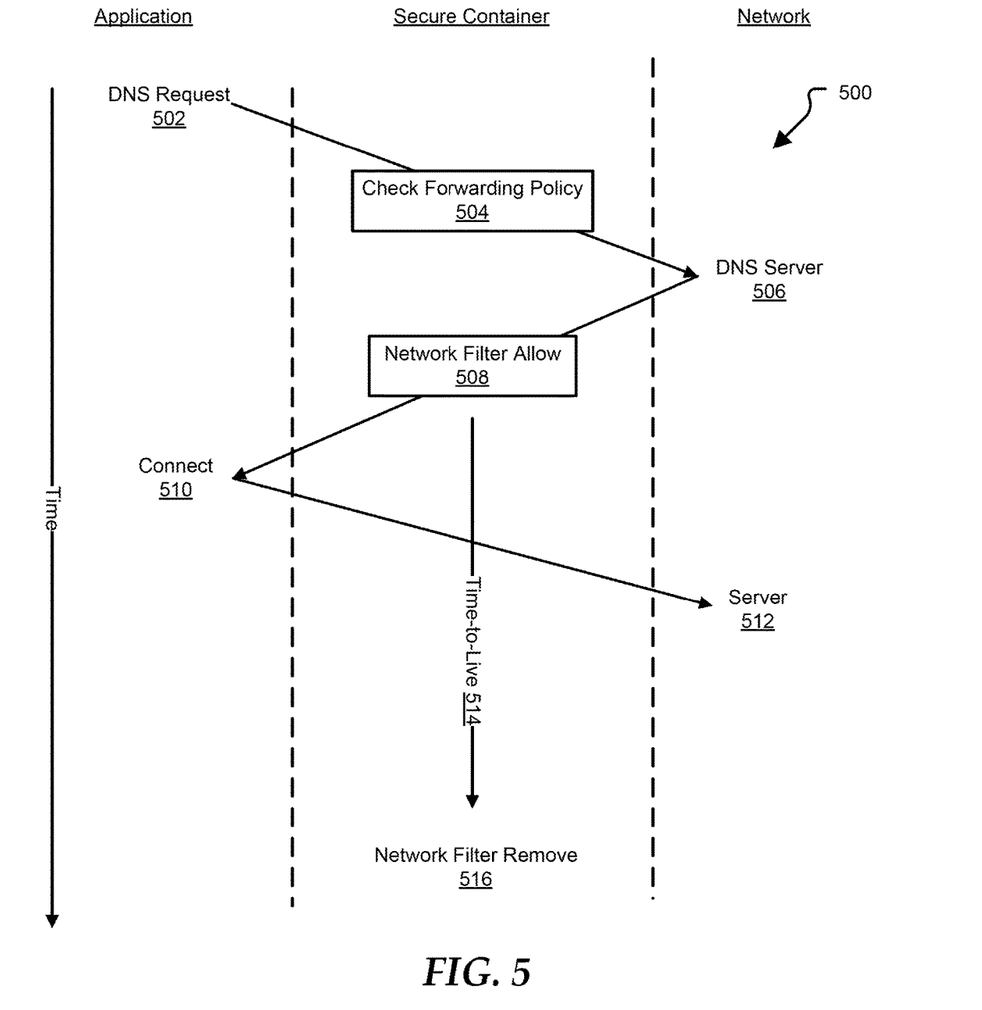
FIG. 5 is a diagram illustrating communication between an application in a secure container and a server, in accordance with various embodiments.

FIG. 5 is a diagram illustrating the establishment of a network connection between an application in a secure container, such as application 320 in FIG. 3, with a network server. When first attempting to connect to a named server, the application will trigger a DNS request 502 to be sent. The DNS request will be intercepted by a secure container server and checked against a forwarding policy 504. If the name of the server is on a whitelist of servers, the DNS request will be forwarded to an upstream DNS server 506. The DNS server 506 will return a network address, such as an Internet Protocol (IP) address, to the secure container service. The secure container service will modify the network filter to allow communication between the application and the network address at 508. Once the network filter is updated, the network address will be forwarded to the application, and, at 510, the application can initiate a connection with the server 512.

In addition to modifying the network filter, the secure container service can note the time-to-live (TTL) for the DNS response. The secure container service can track the TTL (at 514) and once the TTL expires, the network rule allowing the communication between the application and the network address can be removed at 516. At this time, if the application requires further communication with the server, another DNS request would be needed, and the cycle could be repeated. In various embodiments, any current live connections between the application and server may be maintained after the TTL expires, and the network filter may only block new connections to the network address of the server.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for provisioning a secure container for running an application, comprising:
routing traffic between the application and a secure container service over a virtual private network;
using network filter rules to restrict network traffic to or from the application other than traffic to or from the secure container service;
using a customized domain name system service to provide name resolution to domain name system requests from the application within the secure container, the name resolution limited to server names allowed by a security policy;
examining the secure container for known vulnerabilities and preventing the secure container from launching when a known vulnerability is detected, the examining including at least one of checking configuration settings to identify combinations of settings that create known vulnerabilities, checking versions of libraries or applications within the secure container to identify unpatched known vulnerabilities, performing a port scan to identify known vulnerabilities, and any combination thereof;
establishing an inbound network proxy to filter and route approved inbound traffic to the application; and
establishing an outbound network proxy to filter and route approved outbound traffic from the application.

2. The method of claim 1, further comprising receiving a request to create the secure container for the application.

3. The method of claim 1, further comprising examining a container image or startup options to determine the security policy for the secure container.

4. The method of claim 1, further comprising capturing data streams from the application and forwarding the data streams to a logging function.

5. The method of claim 1, wherein the inbound network proxy and the outbound network proxy are components of the secure container service.

6. The method of claim 1, wherein the customized domain name system server is provided by the secure container service.

7. A method for providing name resolution for an application within a secure container, the method comprising:
receiving a request for name resolution from the application;
forwarding the request for name resolution to an upstream domain name server if a requested name is allowed by a security policy;
receiving a response from the upstream domain name server, the response including a network address and a time-to-live;
modifying a network filter to allow traffic to the network address;
forwarding the response to the application; and
modifying the network filter to disallow traffic to the network address after the time-to-live has expired.

8. The method of claim 7, wherein the security policy is determined by examining a container image or startup options.

9. The method of claim 7, wherein the application resides within a virtual container.

10. The method of claim 7, wherein the network filter is provided by a secure container service.

11. An information handling system comprising:
a processor configured to:
route traffic between an application and a secure container service over a virtual private network;
use network filter rules to restrict network traffic to or from the application other than traffic to or from the secure container service;
provide name resolution to domain name system requests from the application within the secure container using a customized domain name system server, the name resolution limited to server names allowed by a security policy;
examine the secure container for known vulnerabilities, including at least one of check configuration settings to identify combinations of settings that create known vulnerabilities, check versions of libraries or applications within the secure container to identify unpatched known vulnerabilities, perform a port scan to identify known vulnerabilities, and any combination thereof, prevent the secure container from launching when a known vulnerability is detected;

establish an inbound network proxy to filter and route approved inbound traffic to the application; and establish an outbound network proxy to filter and route approved outbound traffic from the application.

12. The information handling system of claim 11, further comprising receiving a request to create the secure container for the application.

13. The information handling system of claim 11, further comprising examining a container image or startup options to determine the security policy for the secure container.

14. The information handling system of claim 11, further comprising capturing data streams from the application and forwarding the data streams to a logging function.

15. The information handling system of claim 11, wherein the inbound network proxy and the outbound network proxy are components of the secure container service.

\* \* \* \* \*